Sept. 11, 1956     C. F. CLIFFORD     2,762,222
MAGNETIC ESCAPEMENT MECHANISM

Filed May 23, 1950     2 Sheets-Sheet 1

Sept. 11, 1956     C. F. CLIFFORD     2,762,222
MAGNETIC ESCAPEMENT MECHANISM
Filed May 23, 1950     2 Sheets-Sheet 2

INVENTOR
Cecil F. Clifford
BY
Rockwell & Bartholow
ATTORNEYS

United States Patent Office 2,762,222
Patented Sept. 11, 1956

2,762,222

MAGNETIC ESCAPEMENT MECHANISM

Cecil Frank Clifford, Bath, England

Application May 23, 1950, Serial No. 163,607

Claims priority, application Great Britain May 28, 1949

14 Claims. (Cl. 74—1.5)

This invention relates to magnetic escapement mechanism of the kind in which relatively rotatable and oscillatable parts are coupled together magnetically so that the speed of rotation of the rotor is controlled by the frequency of the oscillation.

Examples of a magnetic escapement of the kind aforesaid to which the present invention is applicable are shown in pending applications for patent Serial No. 737,279 and Serial No. 96,747, now Patent Nos. 2,616,298 and 2,690,646, respectively.

It has already been shown in these earlier patent specifications that it is desirable to provide mechanical means for arresting the rotating part or rotor (normally an escape wheel) which will come into operation only if the magnetic coupling between the two parts is disrupted. In this event the mechanical means comes into operation to arrest the escapement and restore the ordinary operative magnetic coupling.

One known form of mechanical arresting means for the purpose set forth, as applied to an escapement mechanism in which one part is the rotor and the other part is the oscillator, comprises a guard pin attached to the oscillator and adapted to come between projections on the periphery of the rotor during normal relative movement but, so that it will engage the projections and arrest the rotor if it is not moving synchronously with the oscillator.

It is an object of the present invention to provide an improved form of arresting means which does not require the careful setting of the guard pin of the device set out above.

According to the present invention a magnetic escapement mechanism of the kind referred to is characterised by a rotor, formed with at least one projection on its periphery, a co-operating stop member mounted to be just clear of the projection at normal escapement speed of said rotor, said rotor and said stop member being mounted for secondary vibration (the primary vibration being that of the oscillator) relative to one another, the natural frequency of said secondary vibration being so chosen as to be in excess of the natural frequency of oscillation of the escapement mechanism, and impulsed, during rotation of the rotor at normal speed, in damped, or out-of-tune frequency and whereby the stop member is adapted to be contacted by the rotor projection through the relative increase of amplitude of the secondary vibration only when the rotor rotates, on disruption of the normal magnetic coupling, at a speed sufficient to impulse the secondary vibration at or close to its natural frequency.

Preferably a plurality of peripheral projections are provided in the form of outer apical extensions of the wavy magnetic track presented by a star-shaped escapement wheel as shown in patent application Serial No. 96,747, now Patent No. 2,690,646.

It may be either the stop member or the rotor itself which is provided with a resilient mounting to allow it to oscillate relative to the other member to provide the secondary vibration. Whichever of the two members is adapted to be oscillated is arranged so that it is impulsed through the rotation of the rotor and has its natural frequency of vibration so chosen that the rate of impulsing reaches the natural frequency of vibration when the speed of the rotor is considerably in excess of its normal escapement speed.

The present invention is preferably put into effect by using a resilient spring strip stop member, which is permanently magnetised and has a natural frequency of vibration which is greater than the natural frequency of the oscillator, but not a harmonic of that frequency.

The stop member will receive an impulse each time a projection passes underneath it. This will not have much appreciable effect on it until it is impulsed at its natural frequency, which can only occur when the rotation of the escape wheel is no longer controlled by the primary oscillator. The stop member is so mounted that when impulsed at or close to its natural frequency by the rotor the amplitude of the vibration of the stop will be sufficient to bring it into contact with the projection or projections.

Alternatively the rotor itself may be resiliently mounted and in this case the impulsing of the secondary oscillation is preferably effected mechanically as by imparting a degree of static unbalance to the rotor. Additionally magnetic impulsing may be used to reinforce the mechanical impulsing and this may be taken by interaction with the oscillating member by choosing such natural frequency for the rotor assembly that it is three times that of the oscillator. The natural frequency of the rotor assembly will then be the third harmonic of the control oscillator frequency, so that the oscillator will both have some effect to hold the rotor at this speed and also to impulse the transverse oscillation of the shaft at the same time.

In order that the invention may be more clearly understood two forms of escapement are described with reference to the accompanying drawings wherein.

Figure 1:
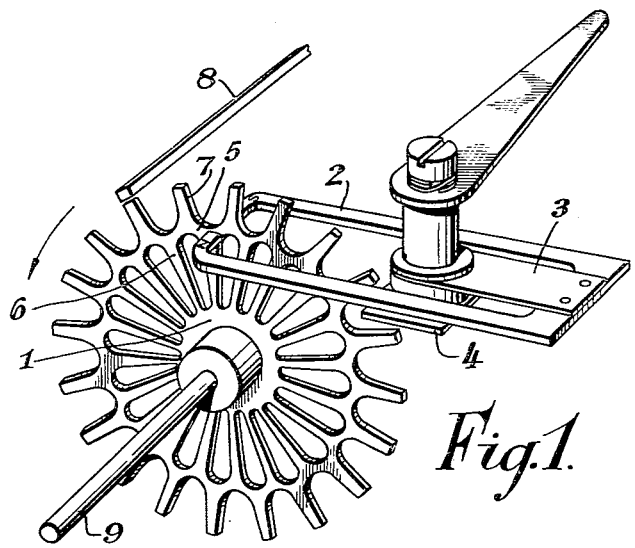
Figure 1 shows a perspective view of one form of escapement mechanism adapted to operate in the manner of the present invention.

The mechanism shown comprises a rotor 1 and a vibrator consisting of a magnet 2 attached to a spring reed 3 mounted on a bracket 4 in such manner that during vibration the magnet moves as though the magnet and spring assembly were pivoted at its center of gravity.

The rotor is made in the shape of a disc from metal having a high permeability. It is formed with an endless wavy track 5 supported from spokes 6, forming inner apical extensions thereto, and provided with peripheral or outer apical extensions 7. A stop member 8 is positioned so that it just clears the projections 7. The best position circumferentially for stop member 8 is best found experimentally for various reasons.

The rotor is carried on a shaft 9 which is so mounted and proportioned for the assembly to have a natural frequency of vibration about three times greater than that of the vibrating magnet 2 (e. g. 150 vibrations/sec. as opposed to 50/sec).

In operation the rotor is driven by any suitable means, such as a conventional clock spring drive and its rotation is controlled in the manner disclosed in my pending application Serial No. 737,279, filed March 26, 1947, now Patent No. 2,616,298, by the magnetic coupling between the wheel and the vibrating magnet, so that the escape wheel moves forward for a distance equal to the distance between two peaks of the wave during each oscillation of the magnet.

The peripheral extensions 7 which are formed as extensions of the peaks of the track 5, together with the spokes 6 have a dual purpose, since they form extensions of the track with which the magnet poles may remain coupled if the amplitude of the magnet vibration is greater than that of the track.

If for some reason the magnetic coupling is broken and the escape wheel 1 comes out of the control of the vibrating magnet 2, it will speed up. Then either or both of two forces may come into play to flex the shaft 9 of the escape wheel assembly:

(i) Any static or dynamic out of balance of the escape wheel assembly which can easily be provided in the making of the assembly and will not prejudice the normal action of the escapement.

(ii) The magnetic impulses as the wavy track passes between the magnet poles.

Either or both of these forces can be utilised to set up a transverse vibration in the shaft, until mechanical interference between the rotor and stop occurs. Thus, the escape wheel may accelerate to a critical speed at which impulses are imparted by the out of balance at the natural frequency of the shaft and rotor assembly. As this speed is attained the amplitude of secondary vibration will increase very greatly until one of the peripheral projections 7 contacts the stop member 8. This will arrest the escape wheel and when the wheel has been so stopped the secondary vibration also substantially ceases, allowing the escapement to restart with the speed of the escape wheel again controlled by the vibration of the magnet and spring assembly.

It has been found experimentally that the escape wheel assembly should reach its natural frequency of vibration at a speed three times the normal escapement speed. At this speed the oscillating magnet has a tendency to follow the wavy track since the rotor will move forward through 1½ waves during a half vibration of the magnet, allowing the magnet to move forward from an outer apical extension 7 to the next but one inner apical extension 6. Since the stop 8 is located above the apices 7 of the track it can also be mounted so as to oscillate with the same frequency as the secondary oscillation and be impulsed to the rotor radially of the rotor with a resultant equal and opposite impulsing force on the wheel axle. Thereby interference engagement of the rotor with the stop due to the effect of the rotor unbalance may be assisted.

It has also been found experimentally that the tops of the projections 7 are best formed square and similarly the stop is set square to the projections, so that the stop acts as a definite check to the rotation of the wheel to cause stoppage and restart.

The transverse vibrations in the shaft 9 and rotor 1 can be induced by static unbalance of the rotating escape wheel 1. Alternatively or additionally the shaft may be formed of strip section (except at the bearings). This will ensure vibration arising in the shaft, even if there is no initial out of balance.

Figure 3:
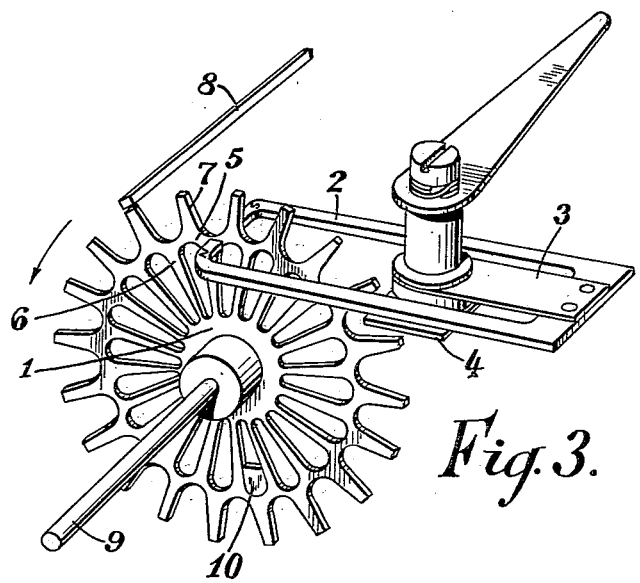
Figure 3 is a perspective view of an escapement mechanism similar to Figure 1 but showing a modified form of rotor.

In Figure 3 of the drawings I have shown a mechanism in which the rotating escapement wheel is statically unbalanced. This unbalanced condition is effected by means of a weight 10 applied to one portion of the wheel so that it will be out of balance and will tend to vibrate when rotated.

Figure 2:
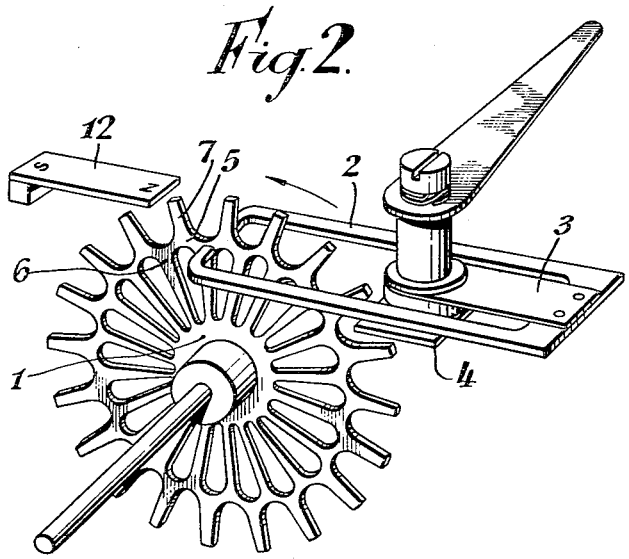
Figure 2 shows a scrap view of a modified form of putting the invention into effect.
Figure 4:
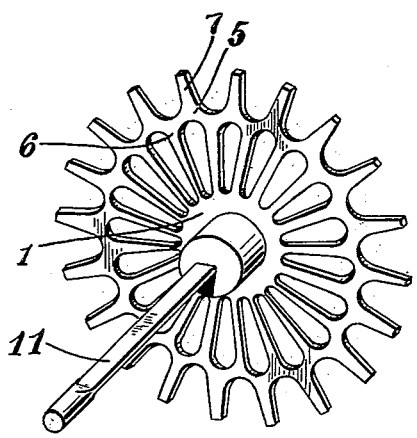
Figure 4 is a perspective view of a rotor having a supported shaft of modified form, which rotor may be used with the constructions of either Figures 1 or 3.

In Figure 4 of the drawings I have shown a rotor similar to that shown in Figures 1 to 3 except that the shaft 11 of the rotor is of strip section or rectangular in form in that one dimension is greater than the other. Thus the shaft does not present the same rigidity to support the weight of the rotor disk in all angular positions. There will, therefore, in one revolution of the shaft be a small deflection. There will, therefore, be a greater deflection when the load is carried by the smaller dimension of the shaft. This rotor may, if desired, also be unbalanced, as shown in Figure 3.

Referring to Figure 2 the escape wheel and oscillating magnets are the same as those shown in Figure 1, but the wheel can be statically balanced and the shaft supporting the rotor has a normal rigidity. The stop member 12 is permanently magnetised as shown having a natural frequency of 75 vibrations/sec. as opposed to the 50 vibrations/sec. of the oscillating magnets. The magnetised stop member receives an impulse each time one of the projections pass underneath it and it will be appreciated that the stop member can only be impulsed at its natural frequency by such interaction when the controlling magnet has lost control of the rotor.

Since the wheel rotates in the direction of the arrow the stop member will dig into the leading surface of the projections when its amplitude is sufficient to cause the arresting operation.

This embodiment has an additional advantage over the known guard pin system in which guard pins hit the periphery of the rotor when the amplitude of vibration of the magnet increases beyond a certain point. This is undesirable, for instance, in car clocks where the amplitude of vibration may be increased greatly over short periods by road shocks. The present construction of arresting device will only come into operation if the rotor comes out of the control of the controlling oscillator and thus allows advantage to be taken of the full amplitude of the vibration of the oscillating magnet. It will also be observed that the stop member will be stiffer than the oscillating magnet system, because this is necessary to give it the higher natural frequency. It will therefore be less susceptible to shock than the controlling oscillator, so that there is little fear of it interfering with the rotor through shock, except when the shock has been so heavy as to disturb the control of escapement by the primary oscillator.

What I claim is:

1. A magnetic escapement of the kind referred to comprising a rotor having at least one projection on its periphery, a shaft carrying said rotor having a natural frequency of vibration, transversely of its axis, means for impulsing said shaft at its natural frequency when rotated at a predetermined speed in excess of normal escapement speed, a stop member mounted so as to be just clear of said projection during controlled rotation and to be contacted by said projection by reason of the increased amplitude of vibration when the shaft is impulsed at its natural frequency, and an oscillator normally controlling the rotation of the escape wheel.

2. A magnetic escapement of the kind referred to comprising a shaft, a disc-shaped escape wheel mounted on said shaft in such manner that the assembly is unbalanced, the shaft and escape wheel assembly having a natural frequency of vibration transversely of its axis when rotated at a predetermined speed in excess of normal escapement speed, a continuous wavy magnetic path formed on said escape wheel, peripheral projections on said escape wheel forming apical extensions of the waves of said wavy magnetic path, a stop member mounted to be just clear of said projections during controlled rotation of the escape wheel and to be contacted by one of said projections by reason of the increased amplitude when the rotor speed reaches a rotational speed at which the unbalance causes the impulsing of the shaft at approximately its natural frequency, and an oscillator normally controlling the rotation of the escape wheel.

3. A magnetic escapement of the kind referred to comprising a disc-shaped escape wheel, a continuous wavy magnetic path on said escape wheel, peripheral projections on said escape wheel forming apical extensions of the waves of said wavy magnetic path, a shaft carrying said escape wheel, said shaft and escape wheel assembly having a natural frequency of vibration transversely of its axis, a vibrating magnet unit having a natural frequency of vibration normally controlling the rotation of the escape wheel, the natural frequency of vibration of the escape wheel and shaft assembly being so chosen that it is impulsed at its natural frequency at three times normal escapement speed by interaction with the vibrating magnet unit, a stop member mounted to be just clear of said projections during controlled rotation of the escape wheel and to be contacted by said projection by reason of the increased amplitude when the rotor speed reaches a rotational speed at which the shaft is impulsed at approximately its natural frequency.

4. A magnetic escapement of the kind referred to comprising an out-of-round shaft, an escape wheel mounted on said shaft, the shaft and escape wheel assembly having a natural frequency of vibration transversely of its axis when rotated at a speed in excess of normal escapement speed, said escape wheel being disc shaped, a continuous wavy magnetic path formed on said disc, peripheral projections on said escape wheel forming apical extensions of the waves of said wavy magnetic path, a stop member mounted to be just clear to said projections during controlled rotation of the escape wheel and to be contacted by said projection by reason of the increased amplitude when the rotor reaches a rotational speed at which changes in the shaft sectional moment of inertia occur at approximately its natural frequency, and an oscillator normally controlling the rotation of the escape wheel.

5. A magnetic escapement of the kind referred to comprising an escape wheel, a shaft mounting said escape wheel, an oscillator normally controlling the rotation of said wheel to give a normal escapement speed, at least one projection on the periphery of said escape wheel, a stop member mounted to be just clear of said projection at normal escapement speed, said escape wheel and said stop member being so mounted as to be relatively oscillatable towards and away from each other to effect a secondary vibration, means associated with the escape wheel for impulsing said secondary vibration at its natural frequency when the escape wheel is rotating at a predetermined speed in excess of normal escapement speed whereby said stop member and said projection are brought into contact by reason of the increased amplitude of the secondary vibration to arrest the rotation of the escape wheel.

6. A magnetic escapement of the kind referred to comprising a disc-shaped escape wheel, a continuous wavy magnetic path on said escape wheel, peripheral projections on said escape wheel forming apical extensions of the waves of said wavy magnetic path, a shaft carrying said escape wheel, a vibrating magnet unit normally controlling the rotation of said escape wheel, a magnetised resilient strip stop member mounted so that one end of said strip is just clear of the projections during normal escapement, the natural frequency of said strip being greater than the natural frequency of the oscillating magnet unit, said strip being impulsed at its natural frequency of vibration by magnetic interaction between itself and the peripheral projections on the escape wheel when the escape wheel is rotated at a predetermined speed in excess of normal escapement speed whereby the stop member arrests the movement of the escape wheel by reason of the contacting of the projections by the stop member through the increased amplitude of its vibration.

7. A magnetic escapement of the character described comprising a rotor having at least one substantially radial projection rigidly carried on its periphery, a shaft member carrying said rotor, a stop member mounted so as to be just clear of said projection during controlled rotation, one of said members being vibratable relatively to the other to complete engagement of the stop member with the peripheral projection on the rotor, means associated with the rotation of the rotor for impulsing said relative vibration, said vibratable member having such a natural frequency of vibration relative to the other member that it is impulsed at its natural frequency when the rotor turns at a predetermined speed in excess of the normal controlled rotational speed of the rotor, and oscillating means for normally controlling the rotational speed of the rotor.

8. A magnetic escapement of the kind referred to characterized by a rotor, and a controlling oscillator normally magnetically coupled thereto, said rotor having at least one projection rigidly carried on its periphery and a cooperating stop member mounted to be just clear of the projection at normal escapement speed of the rotor, said rotor and said stop member being mounted for secondary vibration relative to each other, the natural frequency of said secondary vibration being so chosen as to be in excess of the natural frequency of oscillation of the escapement mechanism and impulsed, during rotation of the rotor at normal speed, in damped or out-of-tune frequency, whereby the stop member is adapted to be contacted by the rotor projection by reason of the relative increase of amplitude of the secondary vibration only when the rotor rotates, on disruption of the normal magnetic coupling at a speed sufficient to impulse the secondary vibration at substantially its natural frequency.

9. A magnetic escapement according to claim 8 in which the escape wheel is disk-shaped and formed with a continuous wavy magnetic path adapted to be coupled to an oscillating magnet, and the leading edge of a wave projection on the escape wheel is engaged by the stop member.

10. A magnetic escapement according to claim 8 including a magnetized resilient strip having a natural frequency of vibration greater than that of the controlling oscillator, said strip being mounted by one end so as to leave the free end just clear of the rotor projections at normal escapement speed.

11. A magnetic escapement according to claim 8 wherein the rotor is mounted on a resilient shaft and the said rotor is statically unbalanced to impulse the said shaft and rotor assembly at its natural frequency of vibration when rotating at a predetermined speed in excess of normal escapement speed.

12. A magnetic escapement according to claim 11 in which the natural frequency of vibration of the rotor and shaft assembly due to the resilience of the shaft is attained at a rotational speed approximately three times normal escapement speed.

13. A magnetic escapement according to claim 8 wherein the rotor is mounted on a resilient shaft of flat strip section, having a natural frequency of vibration so chosen that the rotor and shaft assembly is impulsed at its natural frequency when rotating at a predetermined speed in excess of normal escapement speed.

14. A magnetic escapement of the character described comprising a rotor having a wavy magnetic path thereon and a vibrating magnetic unit cooperating therewith to control the rotation of the rotor, said rotor having at least one projection in its periphery and a cooperating stop member mounted to be just clear of the projection at normal controlled escapement speed of the rotor, said rotor and stop member being mounted for secondary vibration relative to each other, the natural frequency of said secondary vibration being so chosen as to be in excess of the natural frequency of the oscillation of said vibrating unit, and means for impulsing said secondary vibration, during rotation of the rotor at normal speed, in damped or out-of-tune frequency whereby the stop member is adapted to be contacted by the rotor projection by reason of the relative increase of amplitude of the secondary vibration when the rotor rotates at a speed sufficient to impulse the secondary vibration at substantially its natural frequency.

References Cited in the file of this patent

UNITED STATES PATENTS

| | | |
|---|---|---|
| 1,600,346 | MacMurchy | Sept. 21, 1926 |
| 1,825,382 | Baker | Sept. 29, 1931 |
| 2,373,429 | Straumann | Apr. 10, 1945 |
| 2,376,461 | Straumann | May 22, 1945 |
| 2,571,085 | Clifford | Oct. 9, 1951 |